J. H. ASTRUCK & C. J. SALVIOLO.
CIGAR CUTTER.
APPLICATION FILED JAN. 17, 1910.

953,313.

Patented Mar. 29, 1910.

WITNESSES:

INVENTORS
John Henry Astruck
and Carmine J. Salviolo
BY
Arthur E. Juniper
ATTORNEY

UNITED STATES PATENT OFFICE.

JOHN HENRY ASTRUCK AND CARMINE J. SALVIOLO, OF NEW YORK, N. Y., ASSIGNORS TO JOHN HENRY ASTRUCK, OF NEW YORK, N. Y.

CIGAR-CUTTER.

953,313.  Specification of Letters Patent.  Patented Mar. 29, 1910.

Application filed January 17, 1910. Serial No. 538,377.

*To all whom it may concern:*

Be it known that we, JOHN HENRY ASTRUCK and CARMINE J. SALVIOLO, both citizens of the United States, and residents, respectively, of the borough of Manhattan, New York city, county and State of New York, and the borough of Brooklyn, New York city, county of Kings, State of New York, have invented new and useful Improvements in Cigar-Cutters, of which the following is a specification.

This invention relates to a cigar cutter of novel construction which may be easily manipulated, prevents accidental unlocking of the blade, and freely discharges any particles of tobacco that may enter, so that clogging is prevented.

Figure 1:
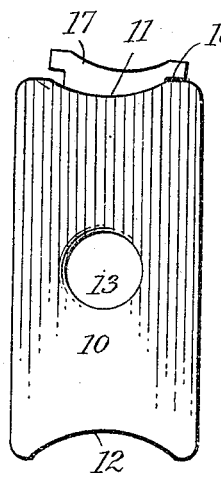
Figure 2:
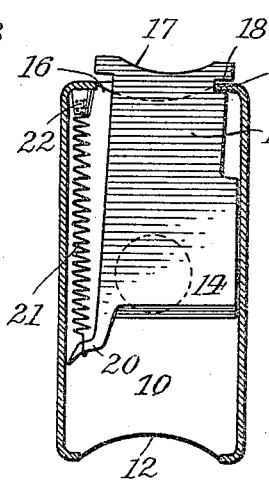
Figure 3:
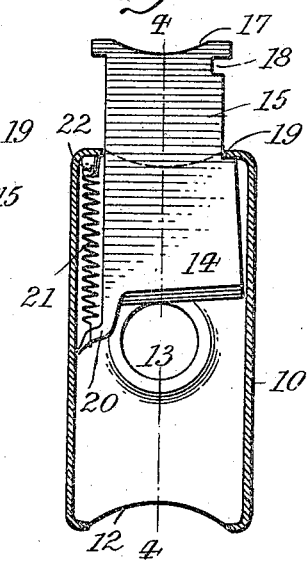
Figure 4:
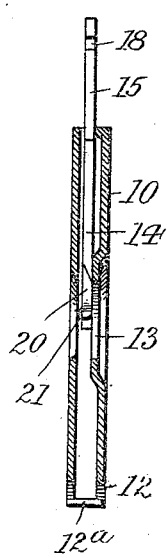
Figure 5:
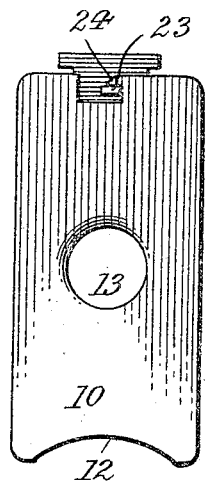

In the accompanying drawing: Figure 1 is a front view of our improved cigar cutter; Fig. 2 a longitudinal section thereof, showing the blade lowered; Fig. 3 a similar section with the blade raised; Fig. 4 a cross section on line 4—4, Fig. 3; Fig. 5 a front view of a modification, and Fig. 6 a longitudinal section thereof.

The casing 10 of the cutter is of flat shape with concave upper and lower edges 11, 12, that constitute finger rests, while a transverse aperture 13 of the casing permits the insertion of the cigar tip to be severed. Within the casing there is free to reciprocate a cutting blade 14, which, in addition to its reciprocative movement, is also capable of a lateral or tilting movement. The shank 15 of blade 14 emerges through an upper slot 16 of casing 10, the width of said slot being greater than that of shank 15, to permit the tilting movement above mentioned. At its top shank 15 terminates in a concave finger rest or handle 17, directly below which there is formed at one edge of shank 15, the first member of a catch, said first member consisting of a notch 18. The second member of the catch is formed by a shoulder 19 of casing 10, located at one side of slot 16. Diagonally opposite to notch 18, blade 14 is provided with a laterally extending finger 20, to which there is secured one end of a spring 21, the other end of which is attached to casing 10 at 22, so that the spring influences the blade on the side opposite to that having the catch. This spring, besides its function of retracting blade 14, has the additional function of slightly tilting said blade laterally during its descent, so as to swing it obliquely across the casing and bring notch 18 into engagement with shoulder 19, and thus locking the blade in its closed position. When the cutter is to be opened, a slight lateral pressure of the finger upon handle 17, away from shoulder 19, will cause notch 18 to be withdrawn from said shoulder, so that the blade, thus liberated, will be raised by spring 21. Any small chips of tobacco that may enter casing 10 will be freely discharged therefrom through a lower opening $12^a$, so that clogging is prevented.

Figure 6:
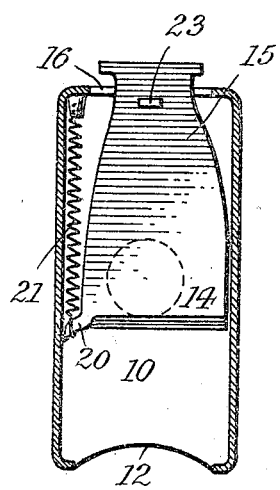

With the construction shown in Figs. 5 and 6, the catch is composed of a pin 23 on shank 15 adapted to engage a hook 24 of casing 10. Pin 23 is approximately centered on shank 15, while hook 24 is correspondingly advanced laterally to engage the pin when the blade is tilted laterally, in the manner above described.

We claim:

1. A cigar cutter, comprising a casing, an inclosed reciprocative and tiltable blade, and a spring for swinging said blade obliquely across the casing.

2. A cigar cutter, comprising a casing having a first catch-member, a reciprocative and tiltable blade having a second catch-member, and a spring for swinging the blade obliquely across the casing and thereby closing the catch.

3. A cigar cutter, comprising a casing having a slot and a first catch-member, a reciprocative tiltable blade of less width than the slot and having a second catch-member, and a spring for tilting the blade and thereby closing the catch.

4. A cigar cutter, comprising a casing having a slot and a first catch-member, a reciprocative tiltable blade of less width than the slot and having an upper second catch-member and a lower finger, and a spring engaging said finger and adapted to tilt the blade and thereby close the catch.

5. A cigar cutter, comprising a casing having a lower concave edge, an inclosed reciprocative tiltable blade having a concave finger-piece, and a spring for swinging the blade obliquely across the casing.

6. A cigar cutter, comprising a casing having an upper slot and a lower discharge opening, an inclosed reciprocative and tiltable blade having a shank of less width than the slot, and a spring for swinging the blade obliquely across the casing.

JOHN HENRY ASTRUCK.
CARMINE J. SALVIOLO.

Witnesses:
W. R. SCHULZ,
FRANK V. BRIESEN.